G. R. MOORE.
Car Coupling.
No. 71,203. Patented Nov. 19, 1867.
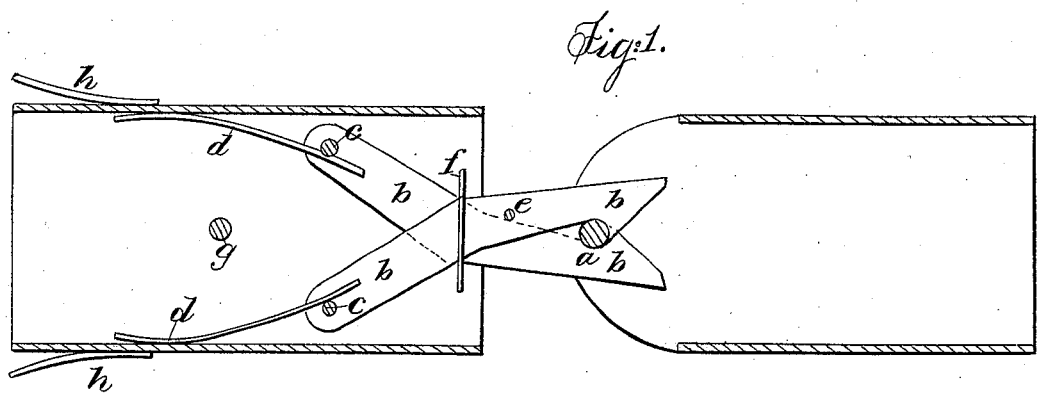
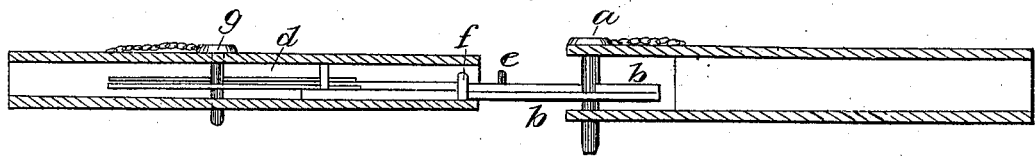
Witnesses
A. Matzinger
Lewis Goulbum
Inventor
Geo R Moore

United States Patent Office.

GEORGE R. MOORE, OF LYONS, IOWA.

Letters Patent No. 71,203, dated November 19, 1867.

IMPROVED CAR-COUPLING.

*The Schedule referred to in these Letters Patent and making part of the same.*

TO ALL WHOM IT MAY CONCERN:

Be it known that I, GEORGE R. MOORE, of Lyons, in the county of Clinton, and State of Iowa, have invented certain new and useful Improvements in Automatic Car-Couplings; and I do hereby declare that the following is a full, clear, and exact description of the same, reference being had to the accompanying drawings, which make a part of this specification, in which—

Figure 1 is a perspective view, or a vertical view, of the working parts of the coupling, the top casing being removed, and Figure 2 is a side view of the same, the side casing being removed.

The object of my invention is to provide a reliable self-catching and self-tightening car-coupling.

The device I employ for that purpose will be readily understood from the drawings, and consists of the usual coupling-pin $a$, made a little longer and stronger than usual, and placed so as to leave a greater space free on either side of it, on the part of one car to be coupled, and of self-adjusting claws $b\ b$ on the part of the other car to be coupled. These claws cross each other and are placed upon pins $c\ c$ on lines converging from the place of crossing.

Now, it will be seen that any outward pressure upon the pin $a$, within the claws $b\ b$, will have a tendency to crowd the claws together, while any pressure from the outside, near the pin $a$, will open the claws. Also the inclined surfaces of the end of the claws serve as arms to facilitate in embracing the pin. To keep the claws together when there is no pressure upon them, the springs $d\ d$ are inserted. To keep the claws from having needlessly wide motions, stays are placed at reasonable limits $E$ and $f$. But should it be desirable to have a greater capacity for motion than can well be given by the claws alone, the whole coupling may be sustained in the bumper by a pin, $g$, and regulated by the springs $h\ h$.

Having thus fully described my invention, what I claim therein as new, and desire to secure by Letters Patent, is—

The double hooks or self-tightening clamps or claws, constructed as described, and pivoted in such a manner as to gripe the pin by the draught of the cars.

GEO. R. MOORE.

Witnesses:
  A. MATSINGER,
  LEWIS GODLOVE.